(12) United States Patent
Hackworth

(10) Patent No.: US 8,117,171 B2
(45) Date of Patent: *Feb. 14, 2012

(54) METHODS, SYSTEMS, AND PRODUCTS FOR UPDATING WEB CONTENT

(75) Inventor: Keith Hackworth, Buford, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/722,569

(22) Filed: Mar. 12, 2010

(65) Prior Publication Data
US 2010/0169286 A1 Jul. 1, 2010

Related U.S. Application Data

(63) Continuation of application No. 11/240,207, filed on Sep. 30, 2005, now Pat. No. 7,698,321.

(51) Int. Cl.
*G06F 7/00* (2006.01)
*G06F 17/00* (2006.01)

(52) U.S. Cl. .......................... 707/689; 707/690; 707/694

(58) Field of Classification Search ........................ None
See application file for complete search history.

(56) References Cited

U.S. PATENT DOCUMENTS

| | | | |
|---|---|---|---|
| 6,021,426 A | 2/2000 | Douglis | |
| 6,112,246 A | 8/2000 | Horbal et al. | |
| 6,606,525 B1 | 8/2003 | Muthuswamy et al. | |
| 6,615,233 B1 | 9/2003 | Davis et al. | |
| 6,771,288 B2 | 8/2004 | Boulter | |
| 6,850,494 B1 | 2/2005 | Bender | |
| 7,051,084 B1 | 5/2006 | Hayton et al. | |
| 7,346,842 B1 | 3/2008 | Hayton et al. | |
| 7,558,776 B2 * | 7/2009 | Gallagher et al. | 1/1 |
| 2002/0010758 A1 | 1/2002 | Chan | |
| 2002/0188631 A1 | 12/2002 | Tiemann et al. | |
| 2002/0194382 A1 | 12/2002 | Kausik | |
| 2003/0009583 A1 | 1/2003 | Chan et al. | |
| 2003/0086098 A1 | 5/2003 | Sesek et al. | |

(Continued)

OTHER PUBLICATIONS

AJAX Interface Design, www.lukew.com/resources/articles/ajax_design.asp, by Luke Wroblewshi, May 14, 2005.*

(Continued)

*Primary Examiner* — Jay Morrison
(74) *Attorney, Agent, or Firm* — Scott P. Zimmerman PLLC

(57) ABSTRACT

Methods, systems, and products are disclosed for dynamically updating web content using W3C standards. One such method sends a request to a web server for a web page. A web browser receives and renders a static HTML web page. The web browser periodically sends a query to the web server and, in response, receives a latest date and time stamp indicating the latest update to the web page. The web browser compares the latest date and time stamp to a previously stored date and time stamp representing a previous update. If the latest date and time stamp matches the previously stored date and time stamp, then no update has occurred and no update is required. If, however, the date and time stamps do not match, then the web page has changed since the previous update and the web browser retrieves the latest update to the web page.

18 Claims, 15 Drawing Sheets

U.S. PATENT DOCUMENTS

| | | |
|---|---|---|
| 2003/0236857 A1 | 12/2003 | Takase et al. |
| 2004/0218208 A1 | 11/2004 | Akiyoshi |
| 2004/0258089 A1 | 12/2004 | Derechin et al. |
| 2005/0033926 A1 | 2/2005 | Dumont |
| 2006/0095976 A1 | 5/2006 | Torres et al. |
| 2006/0217126 A1 | 9/2006 | Sohm et al. |
| 2006/0230011 A1 | 10/2006 | Tuttle et al. |
| 2006/0259592 A1 | 11/2006 | Angeline |
| 2007/0055652 A1 | 3/2007 | Hood et al. |

OTHER PUBLICATIONS

Jesse James Garrett, Ajax: A New Approach to Web Applications, Feb. 18, 2005, http://www.adaptivepath.com/publications/essays/archives/000385.php.

* cited by examiner

METHODS, SYSTEMS, AND PRODUCTS FOR UPDATING WEB CONTENT

CROSS-REFERENCE TO RELATED APPLICATIONS

This application is a continuation of U.S. application Ser. No. 11/240,207, filed Sep. 30, 2005, and now issued as U.S. Pat. No. 7,698,321, which is incorporated herein by reference in its entirety.

BACKGROUND

This application generally relates to data processing and to computers and, more particularly, to presentation processing, to data modifying, and to version management in database maintenance.

Conventional methods for updating a webpage are inefficient. When a web browser downloads data, the browser obtains a current status of the data. When that data must be updated, the web browser must again request the data and refresh. If the data is dynamically changing, the web browser must constantly refresh itself. That is, the web browser must constantly re-request the data from the web server. These repeated requests to the server tax the processing abilities of the server. Each page update requires recompilation at the server, and databases must be queried to obtain data for the web page. If hundreds or even thousands of users are requesting updates, the all these requests, queries, and responses tax the server and clog the network.

These conventional methods are especially unsuited for large-scale, real-time updates. When many computer users share access to a software application (such as a database), each user wants to view the latest data without having to constantly refresh the web browser (such as every ten seconds). If each user is forced to constantly refresh their web browser to obtain the latest data, the server and the network experience intensive loading. Ultimately the server hardware and the network must be expensively robust to handle many requests.

What is needed, however, are improved methods, systems, devices, and products for dynamically updating web content. When web content is updated, the web browser should not be required to reload all static and dynamic portions of a web page. These improved concepts of updating web pages should also reduce the processing requirement of a web server, reduce network traffic, and ultimately reduce the cost of hardware equipment.

SUMMARY

The aforementioned problems, and other problems, are reduced, according to the exemplary embodiments, using methods, systems, and products that efficiently update web content. When a web page contains dynamic content, the exemplary embodiments update that dynamic content in real-time (or nearly real-time) without repeatedly taxing a server with data requests. Whereas most web browsers continually request updates to obtain the latest web page data, the exemplary embodiments, instead, first determine whether an update exists. If no update exists, then no updated data is available, so there's no need to make a request to the server. The exemplary embodiments periodically request only a date and time of the latest update to a web page. If the latest date and time has not changed since the last update, the web browser knows nothing has changed and the web page does not need an update. No request for updated data, therefore, need be made to the server. When, however, the latest date and time is newer than the previous update, then the web browser knows that the web page has changed. Only then does the web browser request the updated data. The web browser, then, smartly operates and first checks to see if an update is available before requesting the server to obtain data. The exemplary embodiments, then, avoid repeatedly taxing the server with data requests. In shared, large scale applications the exemplary embodiments may reduce by a magnitude the number of "hits" seen by the server. Because the number of server requests is reduced, the exemplary embodiments allow administrators to utilize less robust, and thus cheaper, hardware.

The exemplary embodiments conform to the World Wide Web Consortium ("W3C") recommendations. Whereas conventional methods for updating a webpage require software plugins and Java coding, the exemplary embodiments utilize only HTML code and Javascript. That is, Javascript is inherent on all browsers and conforms to the W3C recommendations. Because the exemplary embodiments only utilize HTML code and Javascript, the exemplary embodiments do not expose a computer and network to Java's security flaws and risks. The exemplary embodiments, moreover, do not expose computer users and network administrators to the "unknowns" of custom-built software applications. The exemplary embodiments have the advantage, then, of not loading plugins or custom applications. The exemplary embodiments also do not expose a computer and/or network to additional risks other than an "out of box" web browser. Because the exemplary embodiments only utilize HTML code and Javascript, more developers know, understand, and are comfortable using Javascript (as compared to Java). Because of this familiarity, the exemplary embodiments are thus also easier to program.

The exemplary embodiments describe a method for updating content at a web browser. A request is sent to a web server for a web page. The web browser renders a static HTML web page and periodically sends a query to the web server for an update to the web page. In response to the query, a latest date and time stamp is received, with the latest date and time stamp indicating a date and a time of a latest update to the web page. The web browser compares the latest date and time stamp to a previously stored date and time stamp. The previously stored date and time stamp represents a previous update received by the web browser.

In another of the embodiments, a system is disclosed for updating content at a web browser. A web browser stores in memory, and a processor communicates with the memory. The processor sends a request to a web server for a web page. The web browser, in response, receives and renders a static HTML web page. The processor periodically sends a query to the web server for an update to the web page. The processor receives, in response, a latest date and time stamp indicating a date and a time of a latest update to the web page. The web browser compares the latest date and time stamp to a previously stored date and time stamp. The previously stored date and time stamp represents a previous update received by the web browser.

In yet another embodiment, a computer program product is also disclosed for updating content at a web browser. The computer program product comprises a computer-readable medium and a web browser stored thereon. The web browser comprises computer code for sending a request to a web server for a web page. The web browser renders a static HTML web page and then periodically sends a query to the web server for a date and time stamp of a latest update to the web page. The web browser, in response, receives the latest date and time stamp indicating a date and a time of the latest update to the web page. The web browser compares the latest date and time stamp to a previously stored date and time stamp. The previously stored date and time stamp represents the date and time of a previous update received by the web browser.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

Figure 1:
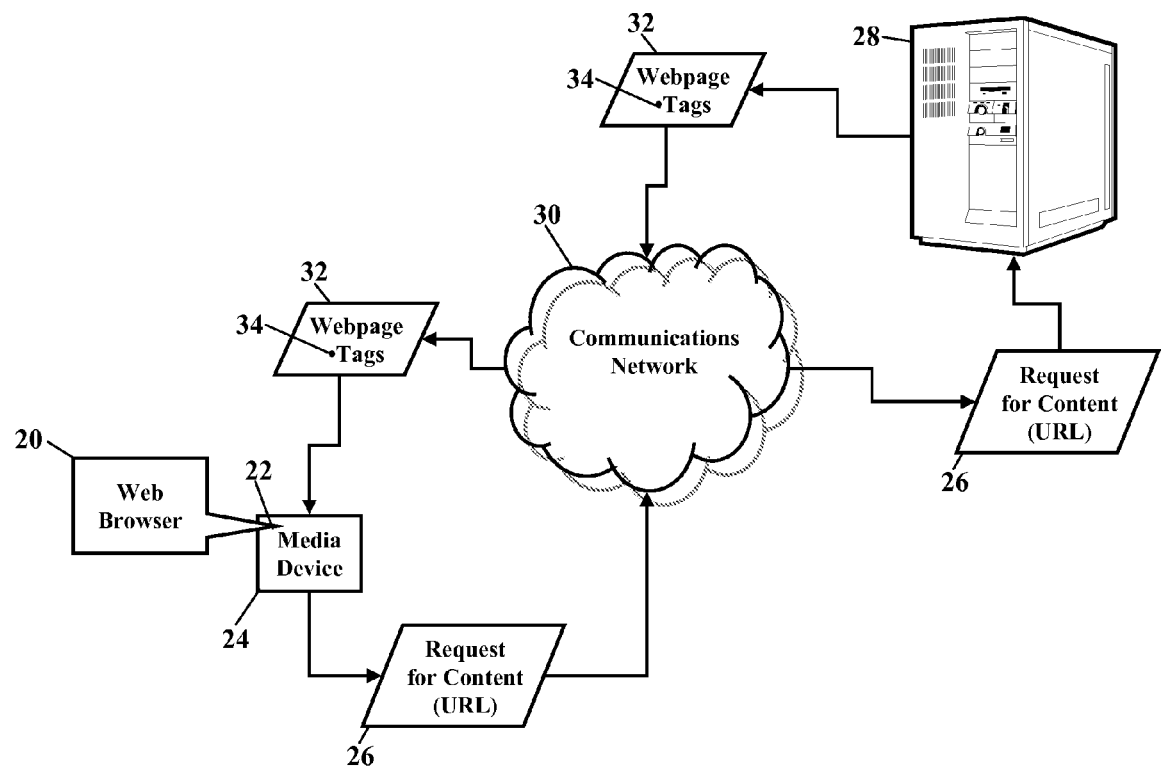
FIGS. 1 and 2 are schematics illustrating exemplary embodiments.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, methods, systems, and products efficient updates to web content. When a web page contains dynamic content, the exemplary embodiments update that dynamic content in real-time (or nearly real-time) without repeatedly taxing a server with data requests. Whereas most web browsers continually request updates to obtain the latest web page data, the exemplary embodiments, instead, first determine whether an update exists. If no update exists, then no updated data is available, so there's no need to make a request to the server. The exemplary embodiments periodically request only a date and time of the latest update to a web page. If the latest date and time has not changed since the last update, the web browser knows nothing has changed and the web page does not need an update. No request for updated data, therefore, need be made to the server. When, however, the latest date and time is newer than the previous update, then the web browser knows that the web page has changed. Only then does the web browser request the updated data. The web browser, then, smartly operates and first checks to see if an update is available before requesting the server to obtain data. The exemplary embodiments, then, avoid repeatedly taxing the server with data requests. In shared, large scale applications the exemplary embodiments may reduce by a magnitude the number of "hits" seen by the server. Because the number of server requests is reduced, the exemplary embodiments allow administrators to utilize less robust, and thus cheaper, hardware.

According to exemplary embodiments, HTML code and Javascript are used. The Javascripting that is used conforms to the World Wide Web Consortium ("W3C") recommendations. As the reader reviews this patent document, the reader is assumed to be familiar with HTML, XHTML, Javascript, and XML queries. Because such technologies are known, this patent document will not provide an elementary explanation. If, however, the reader desires more information, the reader is invited to consult the following sources, all of which are incorporated herein by reference in their entirety.

W3C Recommendation, *XHTML™ 1.0 The Extensible HyperText Markup Language* (Second Edition), *A Reformulation of HTML 4 in XML 1.0*, 26 Jan. 2000, revised 1 Aug. 2002.

W3C Recommendation, *XML Query (XQuery) Requirements*, W3C Working Draft, 3 Jun. 2005.

ECMA International, *ECMAScript Language Specification (ECMA-262)*, 3rd edition (December 1999). JavaScript is the Netscape-developed object scripting language and is a superset of the ECMA-262 standard scripting language.

Figure 2:
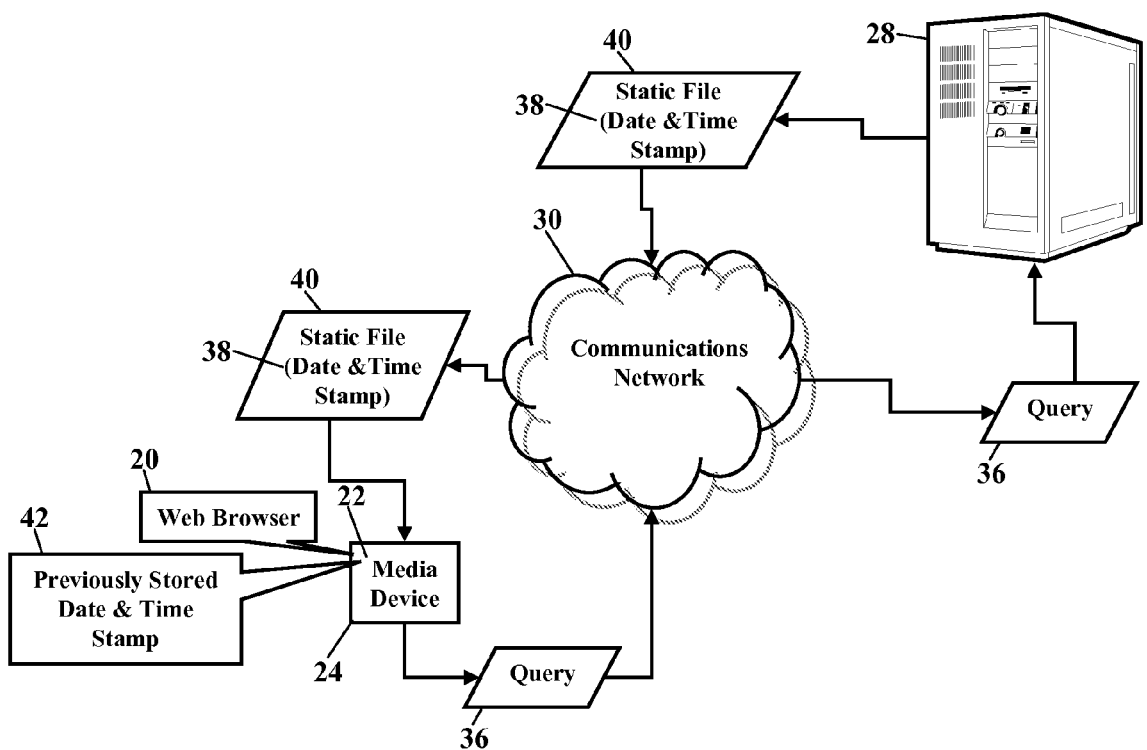

FIGS. 1 and 2 are schematics illustrating exemplary embodiments. A web browser 20 is stored in memory 22 of a media device 24. Although the media device 24 is generically shown, the media device 24, as will be later explained, may be a computer, a television, a television integrated with a decoder (or set-top box), a personal digital assistant (PDA), a cordless/cellular/IP phone, or any other wireline/wireless communications device. The web browser 20 sends a request 26 for content to a server 28. The request 26 communicates via a communications network 30 and is received at the server 28. The server 28 retrieves a web page 32 that corresponds to a Uniform Resource Locator (URL) included with the request 26. The server 28 return communicates the web page 32 via the communications network 30. The web browser 20 receives and renders the web page 32. The web page 32 may comprise static and dynamic portions. The web page 32, for example, may contain static Hyper Text Markup Language (HTML) portions producing or representing a template. The web page 32 may additionally or alternatively comprise one or more tags 34 associated with dynamic portions of the web page 32. As those of ordinary skill in the art understand, a tag defines a logical division within the web page 32, dynamic content is inserted in the division associated with the tag. The XHTML tag "<div>" is one such example, although any other tag equally representative. Because tags are understood in the art, this patent will not further discuss tags.

The exemplary embodiments may be applied regardless of networking environment. The communications network 30 may be a cable network operating in the radio-frequency domain and/or the Internet Protocol (IP) domain. The communications network 30, however, may also include a distributed computing network, such as the Internet (sometimes alternatively known as the "World Wide Web"), an intranet, a local-area network (LAN), and/or a wide-area network (WAN). The communications network 30 may include coaxial cables, copper wires, fiber optic lines, and/or hybrid-coaxial lines. The communications network 30 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

The exemplary embodiments may also be applied regardless of web browser design or vendor. Many different browsers are available for rendering web pages. Microsoft's INTERNET EXPLORER® is perhaps the most common browser in the current market (INTERNET EXPLORER® is a registered trademark of Microsoft Corporation, One Microsoft Way, Redmond Wash. 98052-6399, 425.882.8080, www.Microsoft.com). Other web browser designs, available from other vendors, may also be modified, retrofitted, or designed to include the exemplary embodiments. NETSCAPE®, for example, is another vendor of web browsers that may incorporate the exemplary embodiments (NETSCAPE® is a registered trademark of Netscape Communications Corporation). Other web browsers include Mozilla's Firefox, Opera, and Apple's Safari.

FIG. 2 illustrates web browser queries for updates. When the web browser 20 receives and renders the web page 32, the web browser 20 begins periodically querying for updates. The web browser 20 sends a query 36 to the server 28. The query 36 requests a latest update to the web page 32. Recall that the web page 32 comprises static portions and dynamic portions. The web browser 20 renders the static portions, but, determines whether the dynamic portions are current. As FIG. 2 shows, then, the web browser 20 issues the query 36. The query 36 communicates via the communications network 30 to the server 28. The query 36 asks the server 28 for the latest update date to the web page 32.

The web browser 20 receives a date and time stamp 38. The server 28, in response to the query 36, return communicates the date and time stamp 38. The date and time stamp 38 indicates a date and a time of a latest update to the web page 32. The date and time stamp 38 may be any file that indicates the last update to the web page 32. The date and time stamp 38, for example, may be included within a static file 40 sent from the server 28 to the web browser 20. Because the date and time stamp 38 is contained within the file 40, the server 28 easily retrieves the file 40. That is, the server 28 does not have to make a status request to other data sources. The server 28 simply obtains the file 40, and the file 40 comprises the date and time stamp 38 indicating the last update to the web page 32.

The web browser 20 then makes a comparison. When the web browser 20 receives the file 40, the web browser 20 reads and compares the date and time stamp 38 to a previously stored date and time stamp 42. The previously stored date and time stamp 42 represents a previous update received by the web browser 20. The web browser 20, in simpler terms, checks the last update (represented by the date and time stamp 38) and determines if it is newer than the previous update (represented by the previously stored date and time stamp 42) seen by the web browser 20. If the latest date and time stamp 38 matches the previously stored date and time stamp 42, then no update has occurred. That is, the web page 32 has not dynamically changed since the last query, so the web browser 20 need not update the web page 32. Moreover, if the web browser 20 obtains a null or empty response for the previously stored date and time stamp 42, then the web browser 20 knows that the latest update (represented by the date and time stamp 38) should be retrieved.

Figure 3:
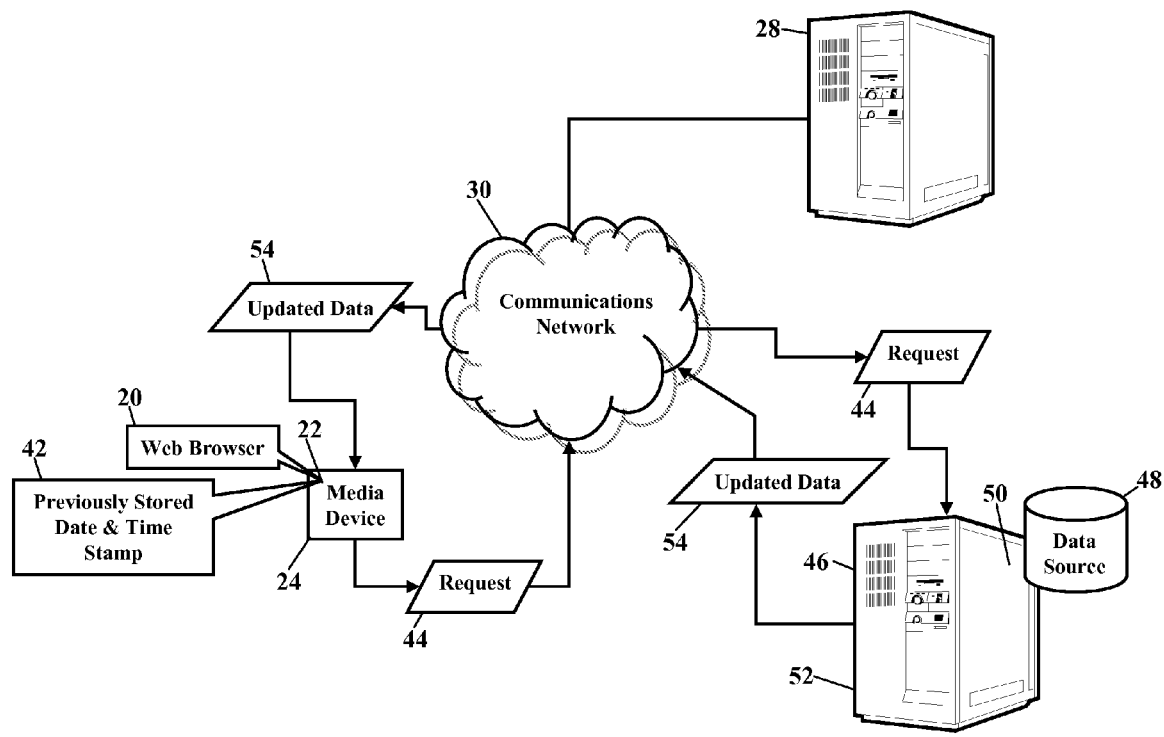
FIG. 3 is a schematic illustrating web browser updates, according to more exemplary embodiments.

FIG. 3 is a schematic illustrating how the web browser obtains latest updates, according to more exemplary embodiments. When the web browser 20 receives the file, the web browser 20 reads and compares the date and time stamp (shown, respectively, as reference numerals 40 and 38 in FIG. 2) to the previously stored date and time stamp 42. If no match is found, then the web browser 20 obtains the latest update. If the latest date and time stamp does not match the previously stored date and time stamp 42, then the web page (shown as reference numeral 32 in FIG. 1) has changed since the previous update. The web browser 20 then retrieves the latest update to the web page. The web browser 20 sends a request 44 to obtain the updated data associated with the tag (shown as reference numeral 34 in FIG. 2). Recall the web page may comprise static and dynamic portions, with the tag associated with a dynamic portion. The request 44 routes via the communications network 30 to a data source 46. The data source 46 may be any memory location that is accessible via the communications network 30. FIG. 3 illustrates the data source 46 as a database 48 stored within memory 50 at a remote server 52. The data source 46 retrieves and return communicates updated data 54 associated with the tag 34. The web browser 20 receives the updated data 54 and replaces the tag with the updated data 54. The data source 46 could alternatively be maintained at the server 28, in which case the request 44 routes via the communications network 30 to the server 28. The server 28 then retrieves and return communicates the updated data 54 associated with the tag 34.

The exemplary embodiments are more efficient. The web browser 20 checks the last update (represented by the date and time stamp 38) and determines if it is newer than the previous update (represented by the previously stored date and time stamp 42). If no match is found, then the web browser 20 knows that the data associated with the tag 34 has changed. The web browser 20 grabs the updated data 54 from whatever source is required to render the web page 32. The web browser 20, then, smartly operates and first checks to see if an update is available before requesting the server 28 to obtain data. The exemplary embodiments, then, avoid repeatedly taxing the remote server 52 with data requests. In shared, large scale applications the exemplary embodiments may reduce by a magnitude the number of "hits" seen by the remote server 52. Because the number of server requests is reduced, the exemplary embodiments allow administrators to utilize less robust, and thus cheaper, hardware. The exemplary embodiments smartly check for an update before requesting the actual update. If no update exists, then the exemplary embodiments need not tax the remote server 52.

Figure 4:
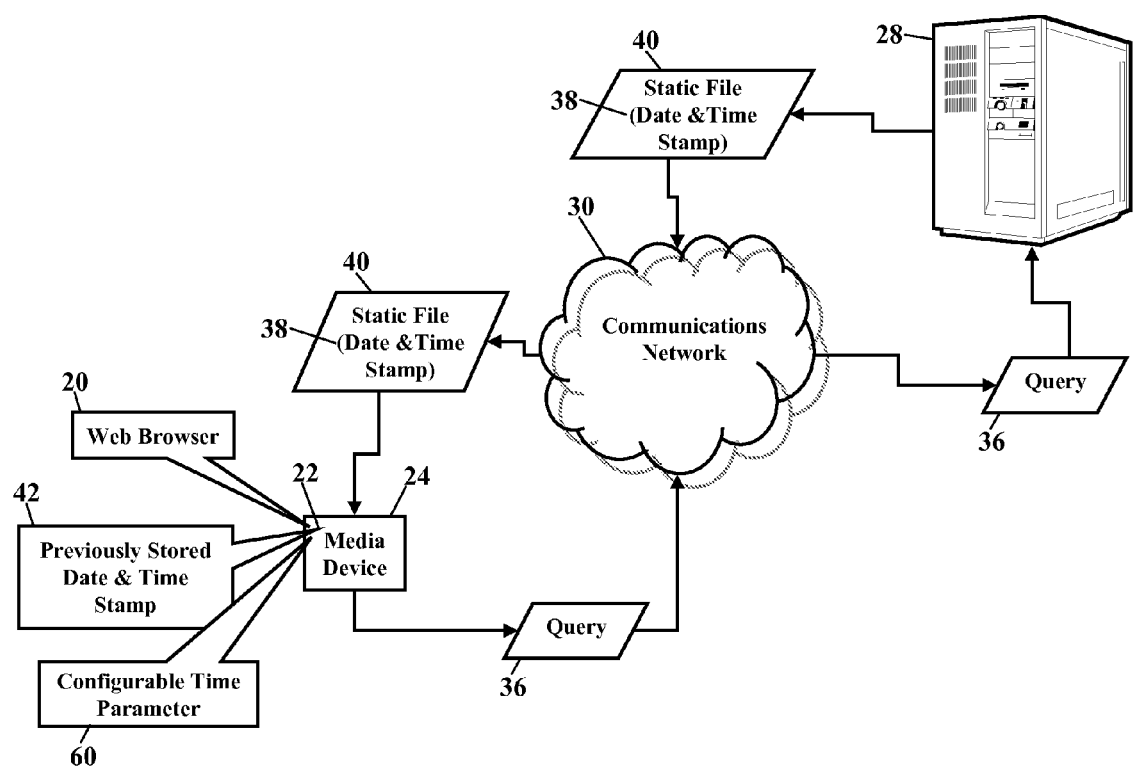
FIG. 4 is a schematic illustrating use of a configurable time parameter, according to more exemplary embodiments.

FIG. 4 is a schematic illustrating use of a configurable time parameter 60, according to more exemplary embodiments. FIG. 4 is similar to FIG. 2, so the common features will not be repeatedly explained. The web browser 20 sends the query 36 to the server 28. The query 36 requests the latest update to the web page 32. The web browser 20, in response, receives the date and time stamp 38 from the server 28. The date and time stamp 38 indicates the date and the time of the latest update to the web page 32. The web browser 20 then compares the date and time stamp 38 to the previously stored date and time stamp 42. The previously stored date and time stamp 42, again, represents the last update received by the web browser 20. If a match is found, then the web browser 20 knows that no update has occurred. Conversely, if no match is found, then the web page 32 has changed since the previous update, and the web browser 20 retrieves the updated data associated with the tag (as FIGS. 2 and 3 and their accompanying text explained).

Here, however, the web browser 20 repeats the above process according to the configurable time parameter 60. Whether the web browser determines an update has, or has not, occurred, the web browser 20 repeats the process. That is, the web browser 20 periodically sends the query 36 according to the configurable time parameter 60. If an administrator or user sets the configurable time parameter 60 as two (2) seconds, then every two seconds the web browser 20 queries for updated data. The configurable time parameter 60 may be set to any value, from nanoseconds to minutes, hours, or even days. The configurable time parameter 60, of course, determines the frequency at which updated data is obtained, so a large configurable time parameter 60 may miss changes in dynamic data. Whatever the configurable time parameter 60, when the updated data 54 is retrieved, the web browser 20 replaces the dynamic data (as represented by the tag 34) with the updated data 54.

The exemplary embodiments provide many advantages. Before the remote server 54 is requested to obtain status data, the exemplary embodiments first check to see if an update is available. The remote server 54 is therefore not repeatedly taxed with data requests. Moreover, the exemplary embodiments allow many users to share database records (or other data) and nearly immediately see changes in a record. That is, each user's web browser can make updates in real time, on the fly, with reduced wear and tear on hardware. Each user can see each record without constantly refreshing their web browser. The exemplary embodiments, instead, effectively instantaneously propagate a change, so that other users immediately see the change.

A work flow management tool provides an example. The exemplary embodiments have been implemented in a work flow management tool that tracks website design tasks. The exemplary embodiments allow all the designers of a website to nearly immediately see changes posted by other designers. As those of ordinary skill in the art understand, a website project may have many tasks, and those tasks may be assigned to one or more groups of designers. All these designers individually work on a portion of the website. Before a designer can make a change to a website, the designer must first click a button on a project management website and "claim" the website. Because conventional methods do not provide a real-time indication, one or more designers may claim a task before the project management website can update its status. The exemplary embodiments, however, provide a real time indication of what designer has claimed a project, without forcing the designers to continually click their "refresh" button.

Figure 5:
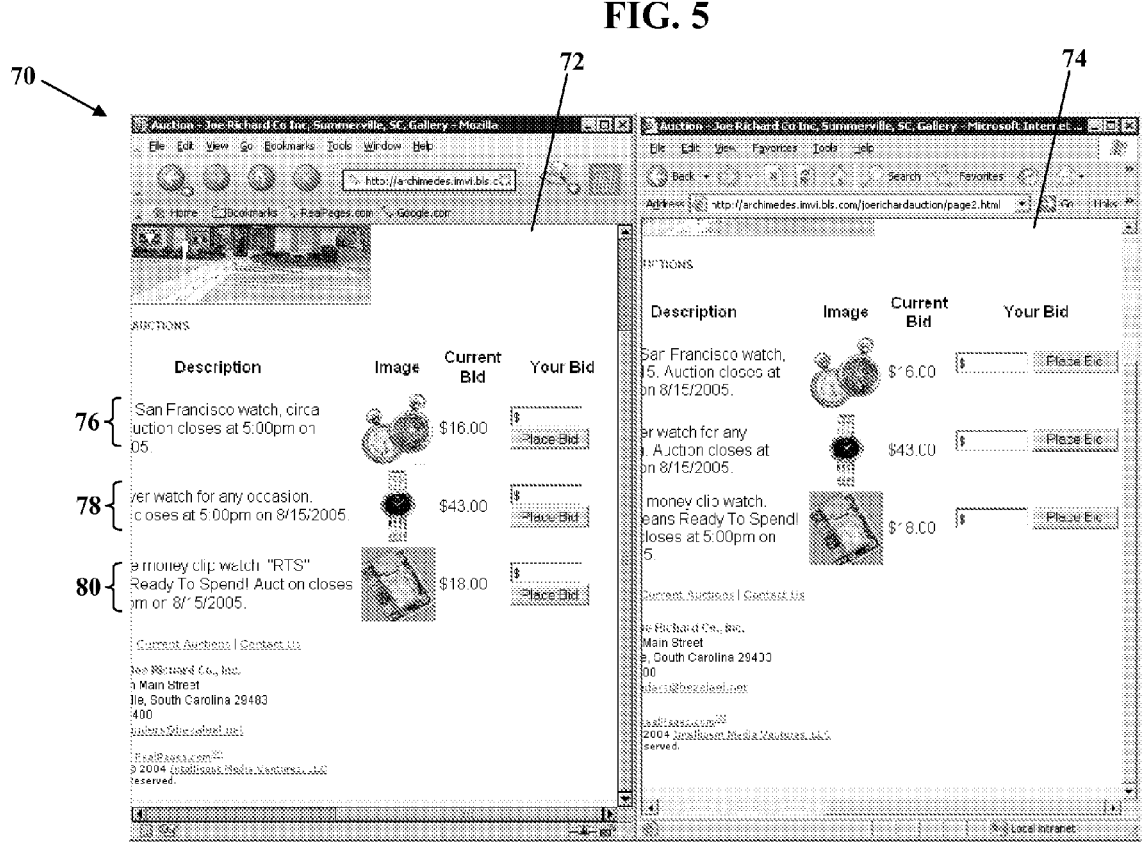
FIGS. 5-7 are schematics illustrating an auction website that incorporates real-time updates, according to exemplary embodiments.
Figure 6:
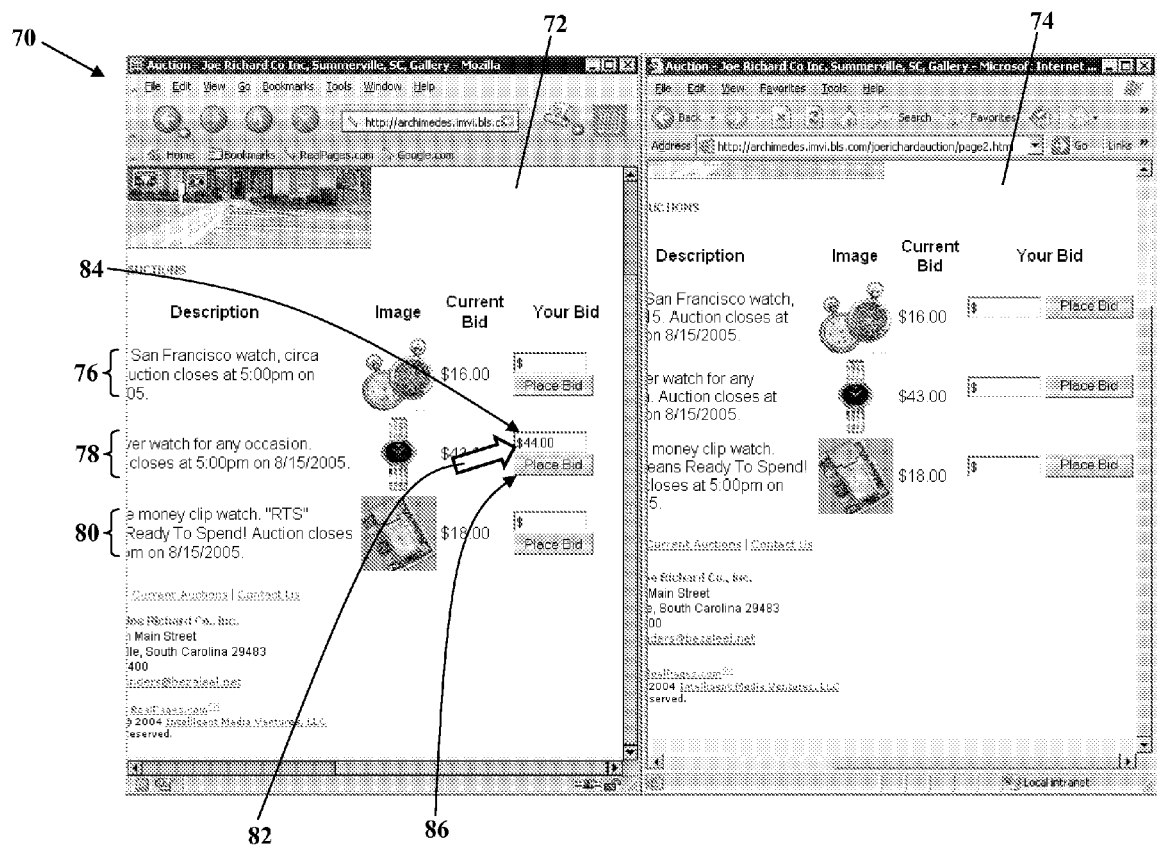
Figure 7:
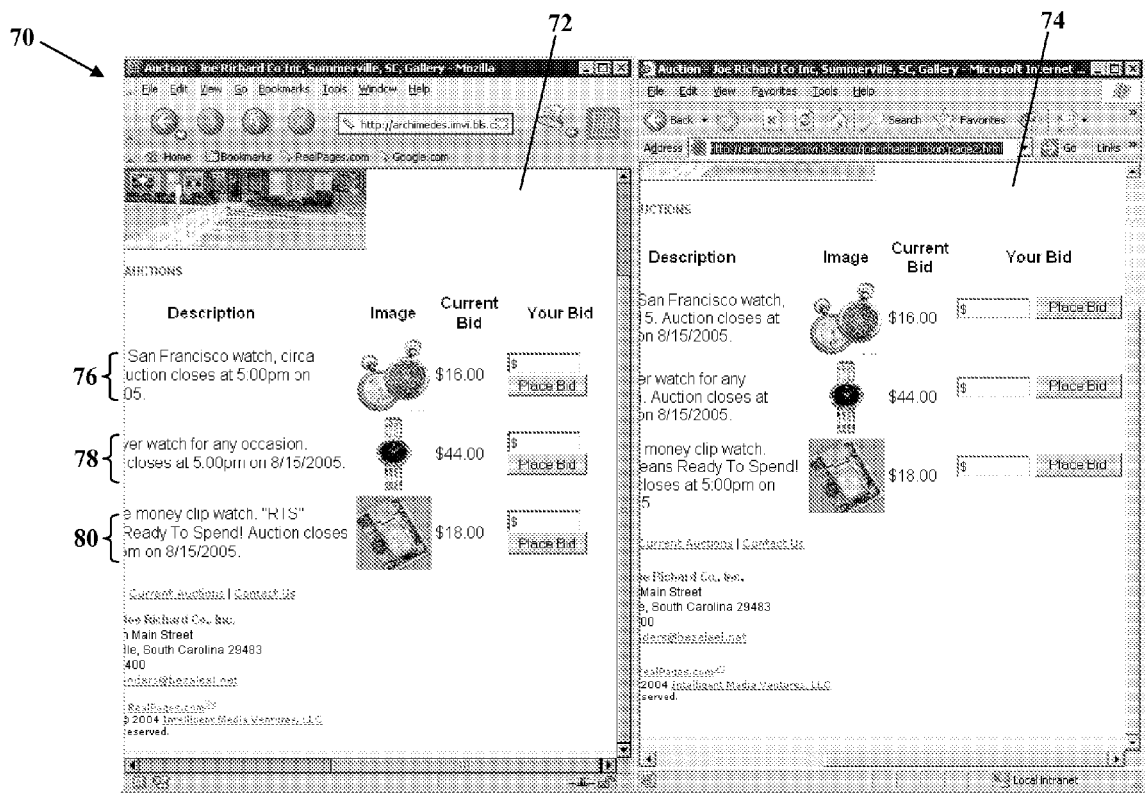

The exemplary embodiments may be retrofitted into an existing website. FIGS. 5-7, for example, illustrate an auction website 70. This auction website 70 has been retrofitted with programming code to provide real-time updates of auction bids, according to exemplary embodiments. FIG. 5 is a screen shot of an auction website 70, as seen by two competing bidders. FIG. 5 illustrates that a first bidder (viewing the left screen shot 72) and a second bidder (viewing the right screen shot 74) both observe current bid amounts for auctioned goods. A pocket watch 76, for example, has a current bid of $16, a wrist watch 78 has a current bid of $44, and a money clip 80 has a current bid of $18.

FIG. 6 illustrates a bid. Here the first bidder (viewing the left screen shot 72) decides to bid on the wrist watch 78. The first bidder places a cursor 82 in a bid field 84 and enters a $44 bid. When the first bidder is ready, the first bidder submits the $44 bid (although not shown, the first bidder places the cursor 82 on a "Place Bid" action button 86).

FIG. 7 illustrates an almost instantaneous and real-time response. Because the second bidder's web browser (such as that shown and referred to as reference numeral 20) utilizes the exemplary embodiments, the second bidder's web browser periodically queries for the date and time stamp (shown as reference numeral 38). When the first bidder submits their higher $44 bid for the wrist watch 78, both the first bidder and the second bidder (viewing the right screen shot 74) almost immediately see the higher $44 bid for the wrist watch. Here, then, the existing auction website 70 has been quickly and inexpensively modified to provide real-time updates of auction bids, according to exemplary embodiments.

The exemplary embodiments may also be applied to other situations. The exemplary embodiments, for example, easily lend themselves to a "chat" environment. As those of ordinary skill in the art understand, a chat program usually utilizes a CGI source. The exemplary embodiments, however, allow users to nearly immediately see text entries with reduced use of a CGI source and without refreshing a screen. The CGI source is used to save the data and to retrieve the data, but the CGI source is only run when an update is posted. The exemplary embodiments, then, naturally create an online chat program. The exemplary embodiments may also be utilized to provide real-time updates for banks and their interest rates, stock market quotes, commodity pricing, weather or temperature changes, and any other information.

Shown below is HTML and JavaScript program code for implementing a chat program. While any programming language may be used, this chat program was developed using the common HTML and Java programming tools. The Javascript is generic, thus allowing the script to be implemented with any application. First, the web browser renders the HTML webpage page. Once the webpage is rendered, the "<BODY onload="getupdateXML( );">tag" causes the web browser to run the JavaScript. This "onload" tag tells the web browser to run the routine called "getupdateXML" after the page is loaded. The "getupdateXML" is a routine that queries the "last update date" file, or chatupdate.xml in this example. When the update file finishes loading, a routine "checkupdateXML" runs. This "checkupdateXML" checks the text that is resulted from the request of chatupdate.xml to see if the date included is different than previously seen. If the date has not changed, the program loops back to getupdateXML after 1 second (or any other configurable time parameter, as explained above). If, however, the last update date is different, the program sets the previous last update date to the current update date and updates "getvalueXML." The "getvalueXML" code makes a request to the server for the actual updated data (in this example, "/cgi-bin/chatter"). On the server, the chatter program grabs the current chat session from the database and returns XML. The JavaScript is set to run "processupdateXML" after the updated data is returned. The code "processupdateXML" parses the updated data and replaces the data within the <DIV> tags labeled "data_value" with what is returned from the XML request. After the update is completed, the process repeats after 1 second.

```
<HTML>
<HEAD>
<SCRIPT language="JavaScript">
var xmlDoc;
var xmlDoc2;
var lastupdate=1;
function getvalueXML( )
{
    if (window.ActiveXObject) {
        xmlDoc2 = new ActiveXObject('Microsoft.XMLDOM');
        xmlDoc2.async="false";
    }
    if (document.implementation &&
document.implementation.createDocument) {
        xmlDoc2 =
document.implementation.createDocument(" "," ",null);
        xmlDoc2.onload=processupdateXML;
    }
    xmlDoc2.load('/cgi-bin/chatter');
    if (window.ActiveXObject) {
        processupdateXML( );
    }
}
function getupdateXML( ) {
    if (window.ActiveXObject) {
        xmlDoc = new ActiveXObject('Microsoft.XMLDOM');
        xmlDoc.async="false";
    }
    if (document.implementation &&
document.implementation.createDocument) {
        xmlDoc =
document.implementation.createDocument(" "," ",null);
        xmlDoc.onload=checkupdateXML;
    }
    xmlDoc.load('/chatupdate.xml');
    if (window.ActiveXObject) {
        checkupdateXML( );
    }
}
function processupdateXML( )
{
    var det;
    det = xmlDoc2.getElementsByTagName('data_value');
    text = det[0].firstChild.nodeValue;
    document.getElementById('data_value').innerHTML=text;
}
function checkupdateXML( )
{
    var dit;
    var thisupdate;
    dit = xmlDoc.getElementsByTagName('last_update');
    thisupdate = dit[0].firstChild.nodeValue;
    if (lastupdate!=thisupdate) {
        lastupdate=thisupdate;
        getvalueXML( );
    }
    lastupdate=thisupdate;
    setTimeout("getupdateXML( );",1000);
}
</script>
</HEAD>
```

-continued

```
<BODY onload="getupdateXML( );">
<DIV id="data_value"></DIV><BR><HR><BR>
<FORM name="chatform" action="/cgi-bin/savechat" target="targ">
<INPUT type=hidden name= 'username' value= 'Keith'> <CENTER>
<INPUT type=hidden name="chat"> <TEXTAREA cols=50 rows=5
name="chat2"></TEXTAREA><INPUT type=button value="Send"
onclick="this.form.chat.value=this.form.chat2.value;
this.form.chat2.value='';this.form.submit( );">
</CENTER>
</FORM>
<IFRAME width=0 height=0 frameborder=0 id="targ"
name="targ"></IFRAME>
</BODY> </HTML>
```

Figure 8:
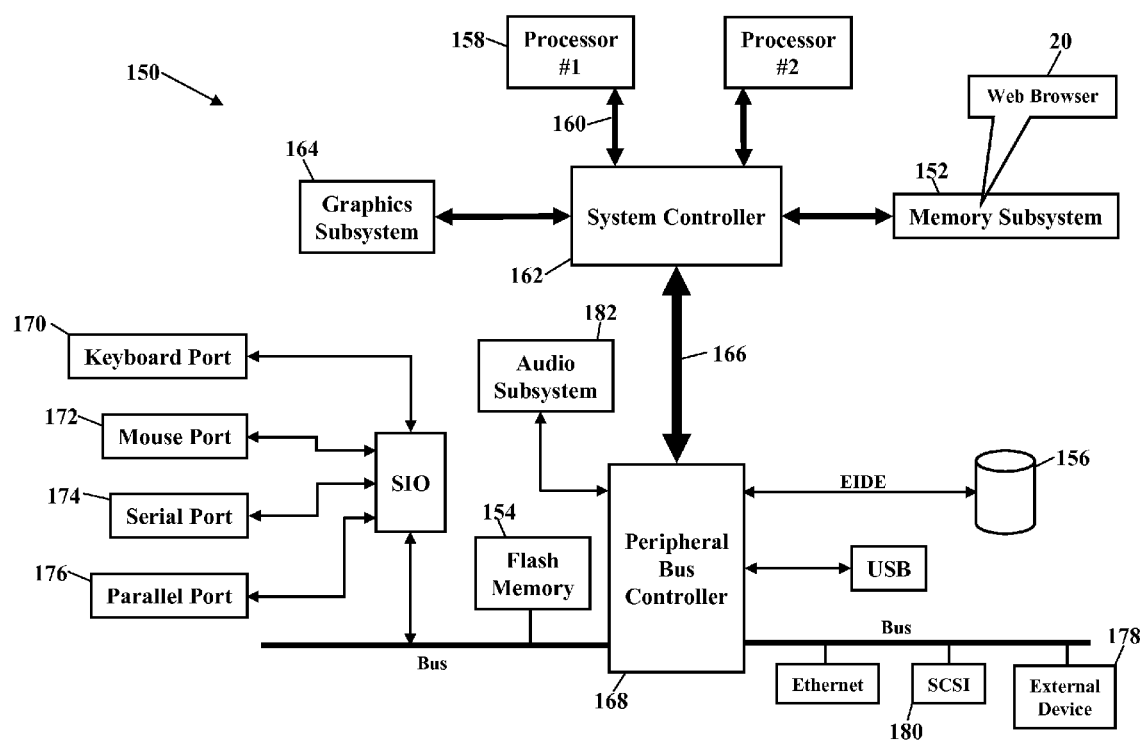
FIG. 8 is a schematic depicting a possible operating environment for exemplary embodiments.

FIG. 8 depicts a possible operating environment for exemplary embodiments. FIG. 8 is a block diagram showing the web browser 20 residing in a processor-controlled system 150 (such as the media device 24 or the server 28 shown in FIGS. 1-4). FIG. 8, however, may also represent a block diagram of any computer or communications device in which the web browser 20 may operate. The web browser 20 operates within a system memory device. The web browser 20, for example, is shown residing in a memory subsystem 152. The web browser 20, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a subscriber of the computer system 150.

Figure 9:
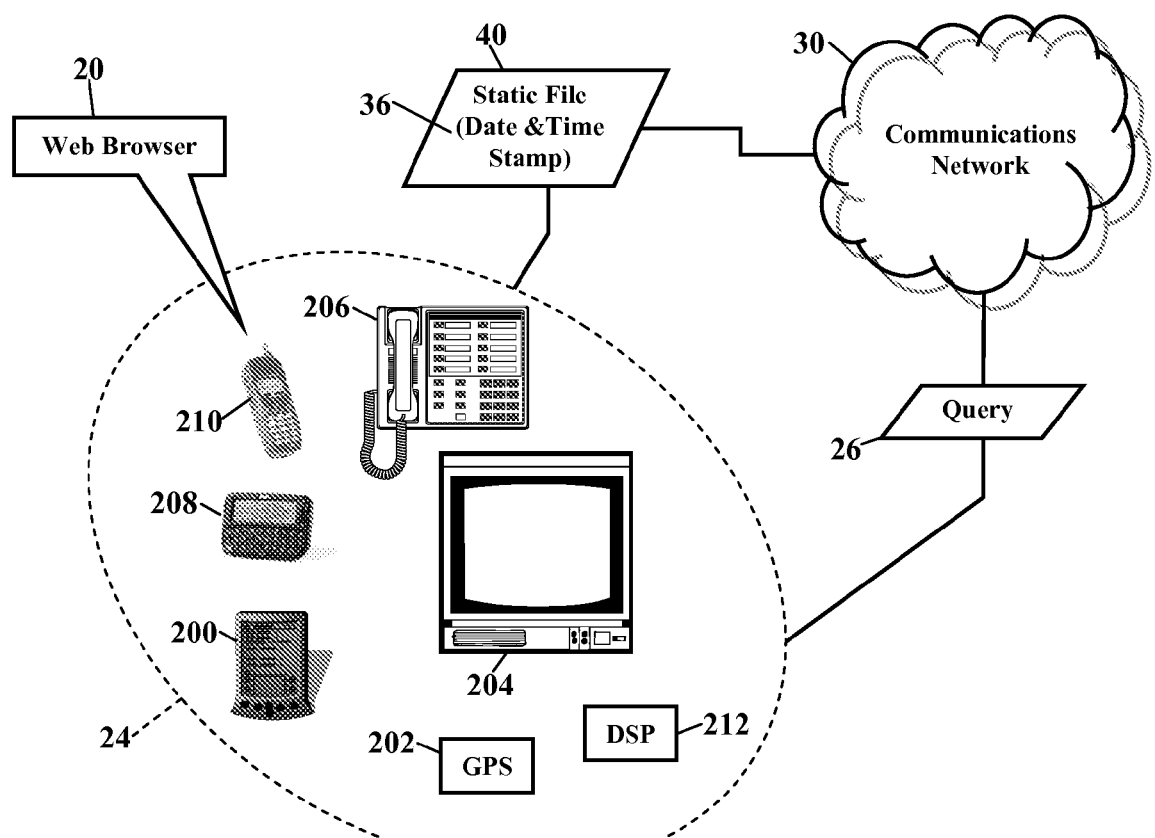
FIG. 9 is a schematic illustrating other possible operating environments for exemplary embodiments.

FIG. 9 is a schematic illustrating still more exemplary embodiments. FIG. 9 illustrates that the web browser 20 may alternatively or additionally operate within various other media devices 24. FIG. 9, for example, illustrates that the web browser 20 may entirely or partially operate within a personal digital assistant (PDA) 200, a Global Positioning System (GPS) device 202, an interactive television 204, an Internet Protocol (IP) phone 206, a pager 208, a cellular/satellite phone 210, or any computer system and/or communications device utilizing a digital signal processor (DSP) 212. The media device 24 may also include watches, radios, vehicle electronics, clocks, printers, gateways, and other apparatuses and systems.

Figure 10:
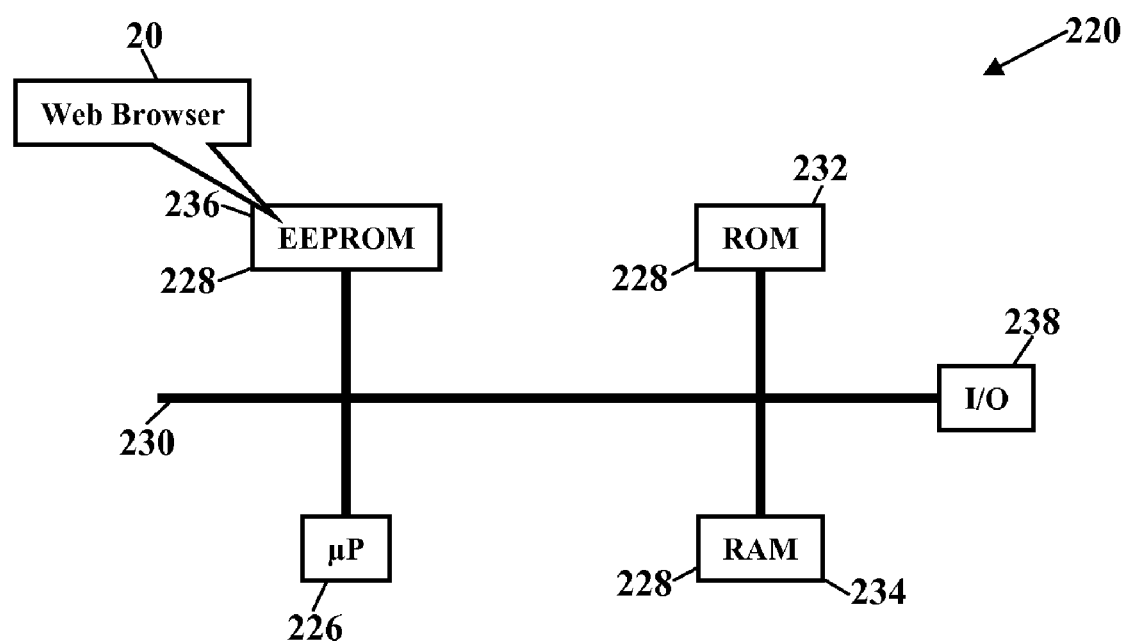
FIGS. 10-13 are schematics further illustrating various media devices for updating web content, according to yet more exemplary embodiments.
Figure 11:
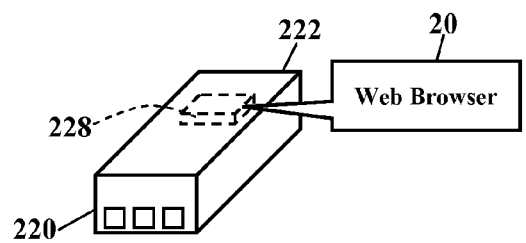
Figure 12:
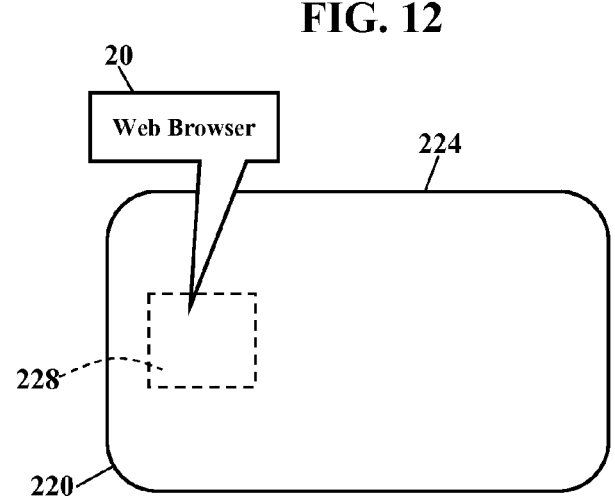

FIGS. 10-12 are schematics further illustrating various other media devices for providing sample content, according to the exemplary embodiments. FIG. 10 is a block diagram of a Subscriber Identity Module 220, while FIGS. 11 and 12 illustrate, respectively, the Subscriber Identity Module 220 embodied in a plug 222 and the Subscriber Identity Module 220 embodied in a card 224. As those of ordinary skill in the art recognize, the Subscriber Identity Module 220 may be used in conjunction with many media devices (such as the media devices 24 shown in FIG. 9). The Subscriber Identity Module 220 stores subscriber information (such as the subscriber's International Mobile Subscriber Identity, the subscriber's $K_i$ number, and other subscriber information), perhaps the subscriber's profile (shown as reference numeral 108), and any portion of the sampling application 20. As those of ordinary skill in the art also recognize, the plug 222 and the card 224 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 10 is a block diagram of the Subscriber Identity Module 220, whether embodied as the plug 222 of FIG. 11 or as the card 224 of FIG. 12. Here the Subscriber Identity Module 220 comprises a microprocessor 226 (µP) communicating with memory modules 228 via a data bus 230. The memory modules may include Read Only Memory (ROM) 232, Random Access Memory (RAM) and or flash memory 234, and Electrically Erasable-Programmable Read Only Memory (EEPROM) 236. The Subscriber Identity Module 220 stores some or all of the web browser 20 in one or more of the memory modules 228. FIG. 10 shows the web browser 20 residing in the Erasable-Programmable Read Only Memory 236, yet the web browser 20 could alternatively or additionally reside in the Read Only Memory 232 and/or the Random Access/Flash Memory 234. An Input/Output module 238 handles communication between the Subscriber Identity Module 220 and the media device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 13:
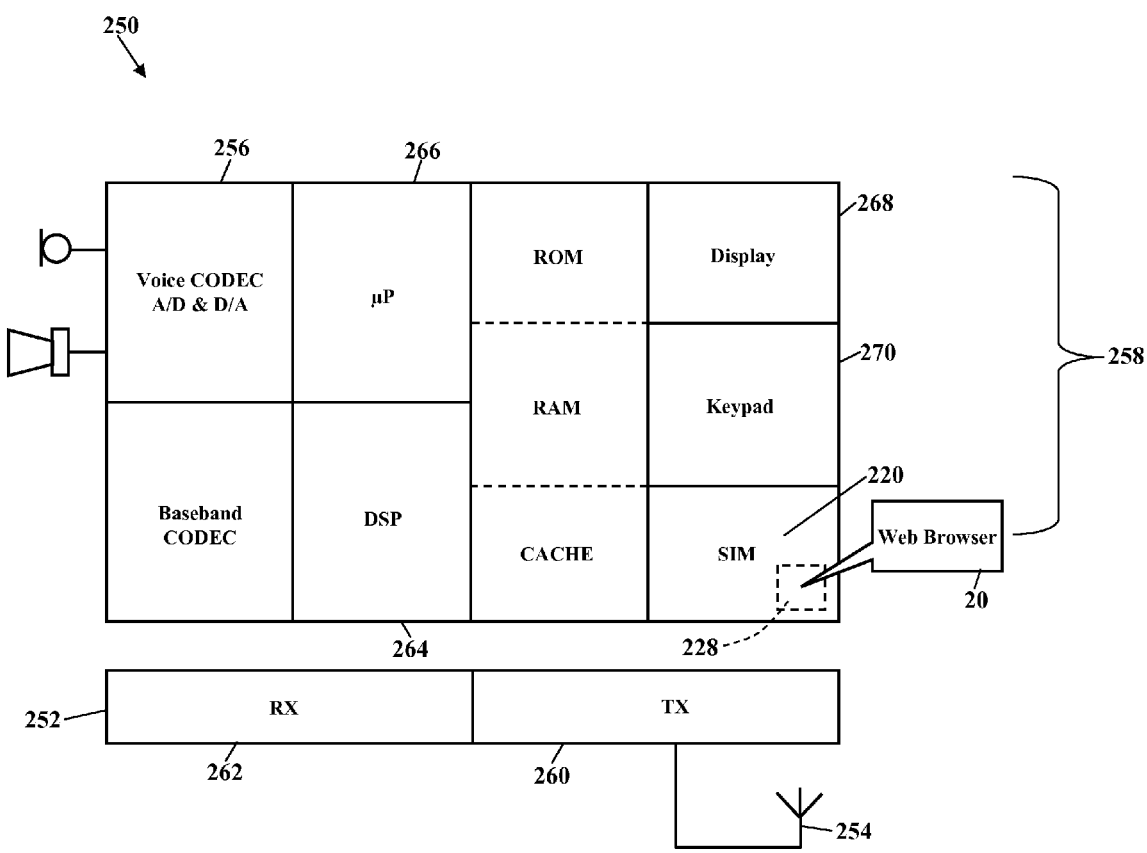

FIG. 13 is a schematic further illustrating various media devices for providing sample content, according to the exemplary embodiments. FIG. 13 is a block diagram of another media device 250 utilizing any portion of the web browser 20. In one embodiment, the media device 250 comprises a radio transceiver unit 252, an antenna 254, a digital baseband chipset 256, and a man/machine interface (MMI) 258. The transceiver unit 252 includes transmitter circuitry 260 and receiver circuitry 262 for receiving and transmitting radio-frequency (RF) signals. The transceiver unit 252 couples to the antenna 254 for converting electrical current to and from electromagnetic waves. The digital baseband chipset 256 contains a digital signal processor (DSP) 264 and performs signal processing functions for audio (voice) signals and RF signals. As FIG. 13 shows, the digital baseband chipset 256 may also include an on-board microprocessor 266 that interacts with the man/machine interface (MMI) 258. The man/machine interface (MMI) 258 may comprise a display device 268, a keypad 270, and the Subscriber Identity Module 220. The on-board microprocessor 266 performs GSM protocol functions and control functions for the radio circuitry 260 and 262, for the display device 268, and for the keypad 270. The on-board microprocessor 266 may also interface with the Subscriber Identity Module 220 and with the web browser 20 residing in the memory module 228 of the Subscriber Identity Module 220. Those skilled in the art will appreciate that there may be many suitable architectural configurations for the elements of the media device 250. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The web browser 20 may be utilized regardless of signaling standard. As those of ordinary skill in the art recognize, FIGS. 10-13 illustrate a Global System for Mobile (GSM) media device. That is, the media device utilizes the Global System for Mobile (GSM) communications signaling standard. Those of ordinary skill in the art, however, also recognize the web browser 20 is equally applicable to any media device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 14:
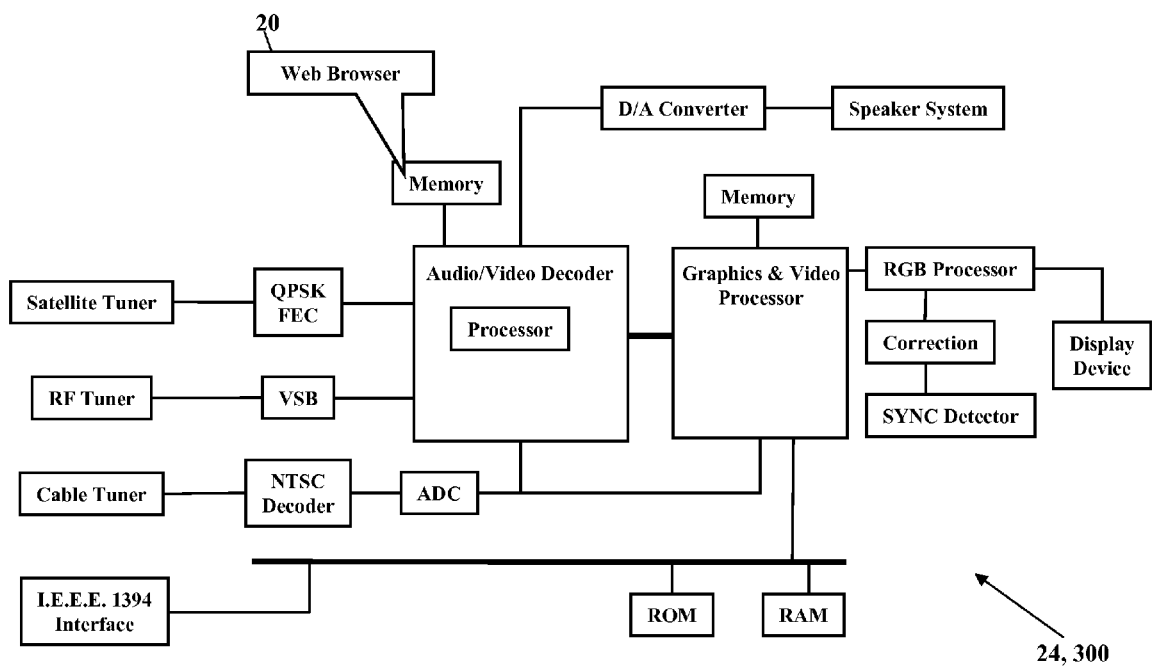
FIG. 14 is a block diagram further illustrating the media device, according to still more exemplary embodiments.

FIG. 14 is a block diagram further illustrating the media device 24, according to yet more of the exemplary embodiments. Here the media device 24 is shown as a digital high definition television (HDTV) system 300. Although an HDTV system is shown, the exemplary embodiments are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The web browser 20 may be stored in any memory location or device in the television 300. FIG. 14, though, is only a simplified block diagram. The operating and engineering principles are already known in the art and will not be repeated here. If, however, the reader desires more information on the television, the reader is directed to the following sources: MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004), with each incorporated herein by reference.

Figure 15:
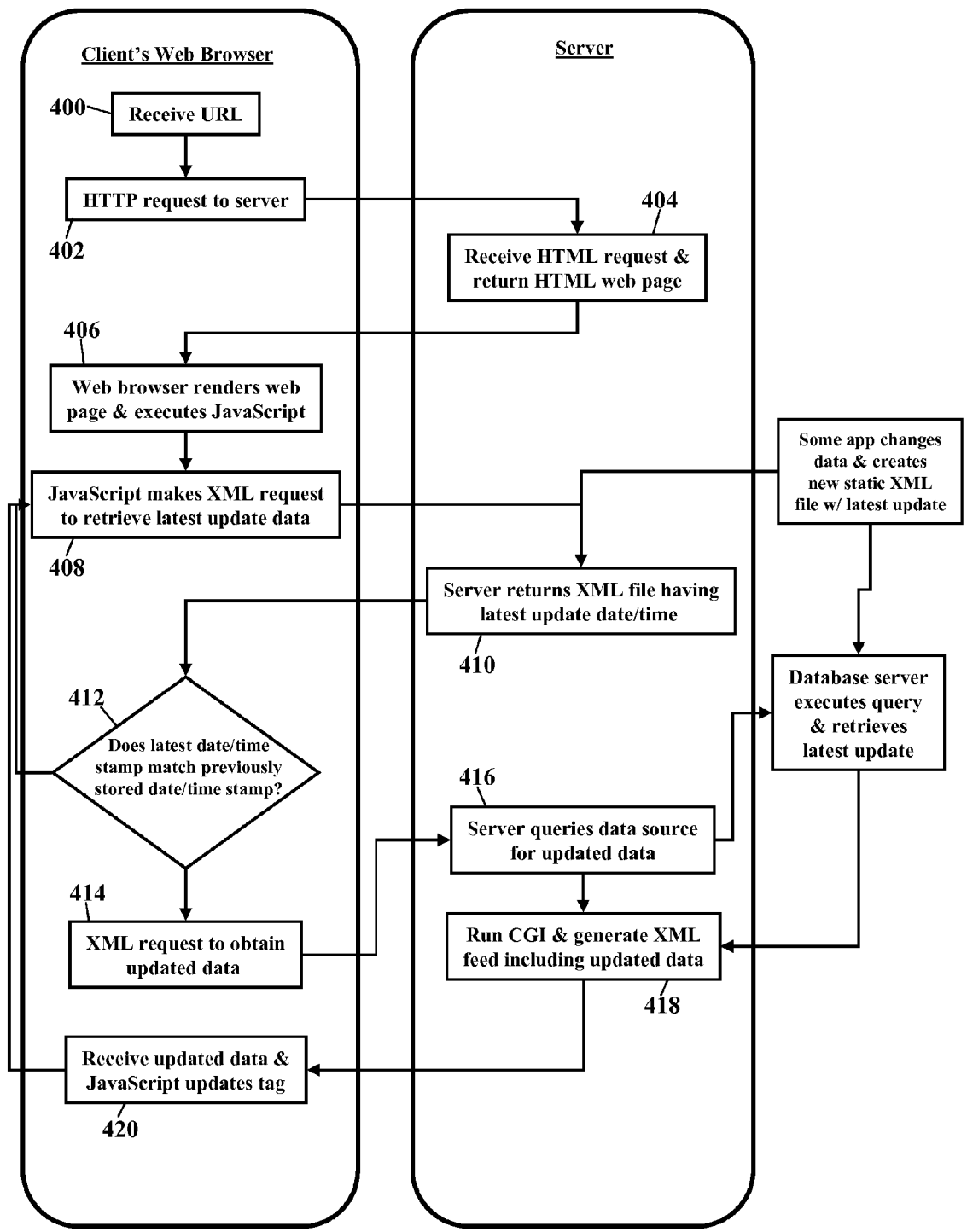
FIG. 15 is a process flow diagram illustrating a method for updating content at a web browser, according to more exemplary embodiments.

FIG. 15 is a process flow diagram illustrating a method for updating content at a web browser, according to more exemplary embodiments. A user enters a URL into the web browser (Block 400). The web browser receives the URL and makes an HTTP request to the web server (Block 402). The web server receives the HTML request and return communicates the HTML web page (Block 404). The web page includes or calls a JavaScript for periodically obtaining updates to the web page. The web page also includes tags identifying dynamic content. The web browser renders the web page and executes the JavaScript (Block 406). The JavaScript causes the web page to make an eXtensible Mark-up Language (XML) request to retrieve the latest update data (Block 408). The web server returns a static XML file having the latest update time and date (Block 410). The web browser receives the latest update time and date, and the JavaScript causes the web browser to compare updates. If the latest date and time stamp is newer than a previously stored date and time stamp (Block 412), then an XML request is made to obtain updated data (Block 414). If, however, the latest date and time stamp is the same as the previously stored date and time stamp (Block 412), then no update is needed and the web page again makes an XML request to retrieve the latest update data (Block 408). When an update is needed, the web server receives the XML request and queries the data source for the updated data (Block 416). The web server runs CGI to generate an XML feed that includes the updated data (Block 418). The updated data is received at the web server, and the JavaScript updates the tag with the updated data (Block 420). The process flow the waits according to the configurable time parameter and again makes an XML request to retrieve the latest update data (Block 408).

Figure 16:
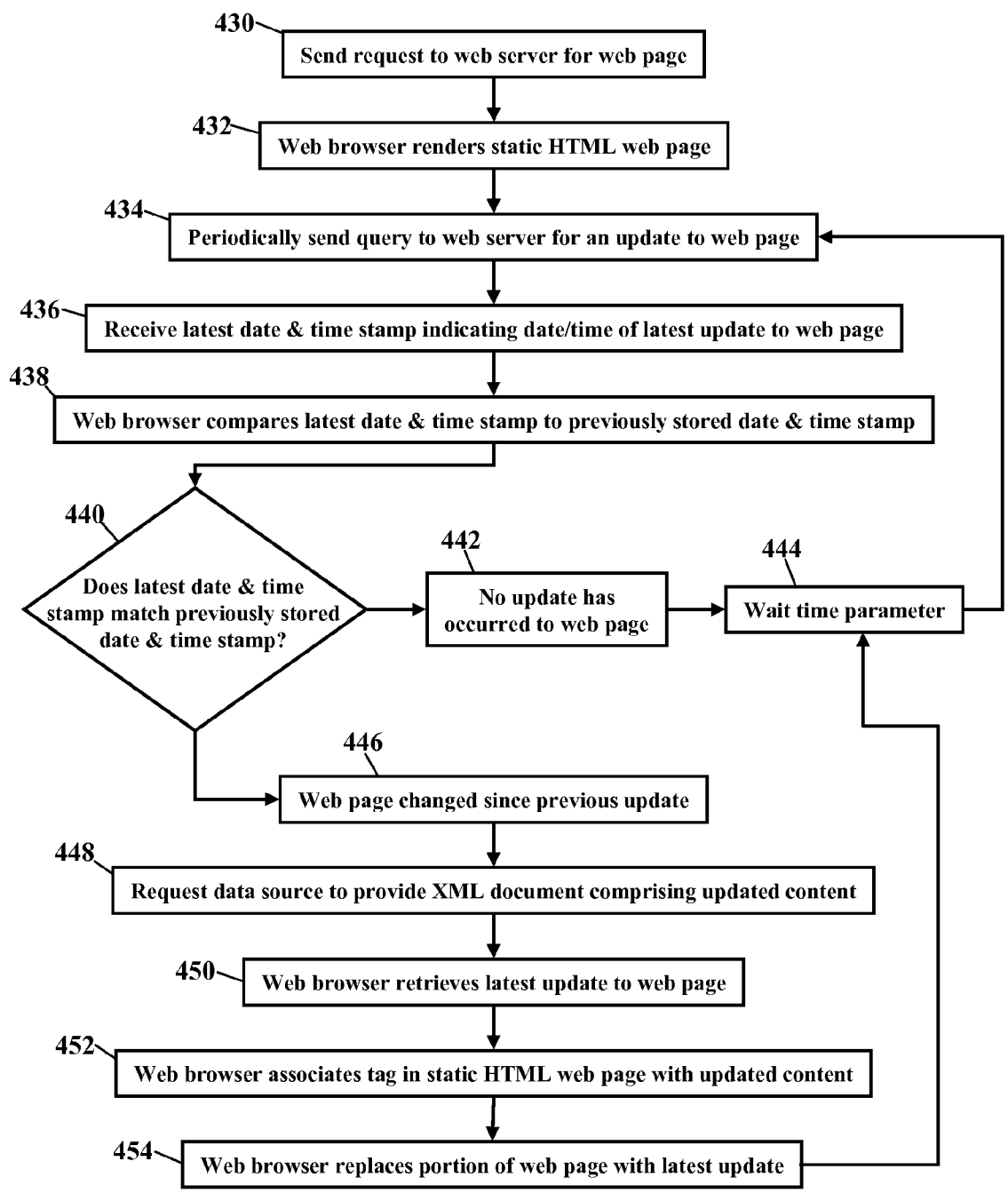
FIG. 16 is a flowchart illustrating another method for updating content at a web browser, according to still more exemplary embodiments.

FIG. 16 is a flowchart illustrating another method for updating content at a web browser, according to still more exemplary embodiments. A request is sent to a web server for a web page (Block 430). The web browser renders a static HTML web page (Block 432). A query is periodically sent to the web server for an update to the web page (Block 434). A latest date and time stamp is received, indicating a date and a time of a latest update to the web page (Block 436). The web browser compares the latest date and time stamp to a previously stored date and time stamp (Block 438). The previously stored date and time stamp represents a previous update received by the web browser. If the latest date and time stamp matches the previously stored date and time stamp (Block 440), then no update has occurred and the web browser does not update the web page (Block 442). The method then again performs the query, according to a configurable time parameter (Block 444). If, however, the latest date and time stamp does not match the previously stored date and time stamp (Block 442), then the web page has changed since the previous update (Block 446). A request is made to a data source to provide an XML document comprising updated content (Block 448). The web browser retrieves the latest update to the web page (Block 450) and associates a tag in the static HTML web page with updated content (Block 452). The web browser then refreshes with the latest update to the web page (Block 454).

The web browser (shown as reference numeral 20 in FIGS. 1-14) and/or the JavaScript program may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-subscribers, licensees, and assignees. A computer program product comprises the web browser stored on the computer-readable medium. The web browser comprises computer-readable instructions/code for sending a request to a web server for a web page. The web browser renders a static HTML web page and periodically sends a query to the web server for an update to the web page. A latest date and time stamp is received indicating a date and a time of a latest update to the web page. The web browser compares the latest date and time stamp to a previously stored date and time stamp. The previously stored date and time stamp represents a previous update received by the web browser.

The web browser may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for dynamically updating web content, comprising:

sending a request for a web page from a web browser to a web server;

receiving the web page in response to the request, the web page having a static portion and a dynamic portion;

rendering only the static portion of web page by the web browser;

periodically sending a query from the web browser to the web server that requests a latest date and time associated with the dynamic portion;

receiving a latest date and time stamp at the web browser in response to the query, the latest date and time stamp indicating a most recent version of the dynamic portion of the web page;

comparing the latest date and time stamp to a previously stored date and time stamp representing a previous version of the dynamic portion of the web page;

rendering the dynamic portion of the web page by the web browser when the latest date and time stamp matches the previously stored date and time stamp, as the dynamic portion of the web page is unchanged;

retrieving the most recent version of the dynamic portion of the web page when the latest date and time stamp fails to match the previously stored date and time stamp; and querying a data source for the most recent version of the dynamic portion of the web page when the web browser retrieves a null response for the previously stored date and time stamp.

2. The method according to claim 1, further comprising querying for the dynamic portion of the web page.

3. The method according to claim 1, further comprising receiving the static portion of the web page.

4. The method according to claim 1, further comprising receiving the dynamic portion of the web page.

5. The method according to claim 1, further comprising receiving the most recent version of the dynamic portion of the web page.

6. The method according to claim 1, further comprising receiving a static file comprising the latest date and time stamp indicating the most recent version of the dynamic portion of the web page.

7. The method according to claim 1, further comprising periodically querying for the dynamic portion of the web page according to a configurable time parameter.

8. A system, comprising:
a processor executing code stored in memory, the code causing the processor to:

send a request for a web page from a web browser to a web server;

receive the web page in response to the request, the web page having a static portion and a dynamic portion;

render only the static portion of web page by the web browser;

periodically send a query from the web browser to the web server that requests a latest date and time associated with the dynamic portion;

receive a latest date and time stamp at the web browser in response to the query, the latest date and time stamp indicating a most recent version of the dynamic portion of the web page;

compare the latest date and time stamp to a previously stored date and time stamp representing a previous version of the dynamic portion of the web page;

render the dynamic portion of the web page by the web browser when the latest date and time stamp matches the previously stored date and time stamp, as the dynamic portion of the web page is unchanged;

retrieve the most recent version of the dynamic portion of the web page when the latest date and time stamp fails to match the previously stored date and time stamp; and query a data source for the most recent version of the dynamic portion of the web page when the web browser retrieves a null response for the previously stored date and time stamp.

9. The system according to claim 8, further comprising code that causes the processor to query for the dynamic portion of the web page.

10. The system according to claim 8, further comprising code that causes the processor to query for the static portion of the web page.

11. The system according to claim 8, further comprising code that causes the processor to separately receive the static portion of the web page.

12. The system according to claim 8, further comprising code that causes the processor to separately receive the dynamic portion of the web page.

13. The system according to claim 8, further comprising code that causes the processor to receive a static file comprising the latest date and time stamp.

14. A non-transitory computer readable medium storing processor executable code for performing a method, the method comprising:

sending a request for a web page from a web browser to a web server;

receiving the web page in response to the request, the web page having a static portion and a dynamic portion;

rendering only the static portion of web page by the web browser;

periodically sending a query from the web browser to the web server that requests a latest date and time associated with the dynamic portion;

receiving a latest date and time stamp at the web browser in response to the query, the latest date and time stamp indicating a most recent version of the dynamic portion of the web page;

comparing the latest date and time stamp to a previously stored date and time stamp representing a previous version of the dynamic portion of the web page;

rendering the dynamic portion of the web page by the web browser when the latest date and time stamp matches the previously stored date and time stamp, as the dynamic portion of the web page is unchanged;

retrieving the most recent version of the dynamic portion of the web page when the latest date and time stamp fails to match the previously stored date and time stamp; and querying a data source for the most recent version of the dynamic portion of the web page when the web browser retrieves a null response for the previously stored date and time stamp.

15. The non-transitory computer readable medium according to claim 14, further comprising code for querying for the dynamic portion of the web page.

16. The non-transitory computer readable medium according to claim 14, further comprising code for separately receiving the static portion of the web page.

17. The non-transitory computer readable medium according to claim 14, further comprising code for separately receiving the dynamic portion of the web page.

18. The non-transitory computer readable medium according to claim 14, further comprising code for receiving a static file comprising the latest date and time stamp.

* * * * *